L. S. BURRIDGE.
TYPE WRITING MACHINE.
APPLICATION FILED FEB. 15, 1908.
973,341. Patented Oct. 18, 1910.
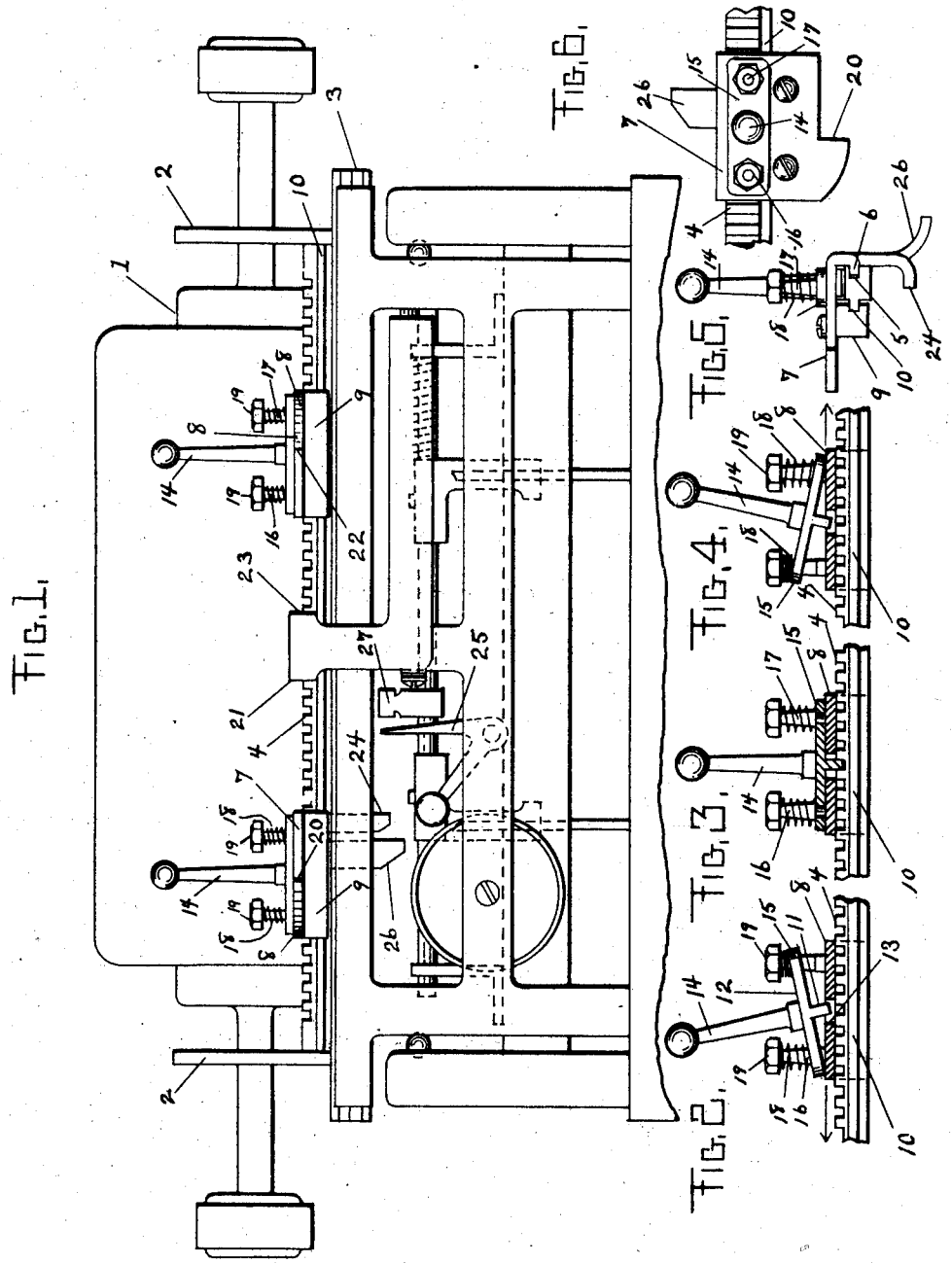
WITNESSES:
Charles W. Howell Jr.
Francis L. Smyth Jr.
INVENTOR
Lee S. Burridge

UNITED STATES PATENT OFFICE.

LEE S. BURRIDGE, OF NEW YORK, N. Y.

TYPE-WRITING MACHINE.

973,341. Specification of Letters Patent. Patented Oct. 18, 1910.

Application filed February 15, 1908. Serial No. 416,000.

*To all whom it may concern:*

Be it known that I, LEE S. BURRIDGE, a citizen of the United States, residing in the borough of Manhattan, city, county, and State of New York, have invented certain new and useful Improvements in Type-Writing Machines, of which the following is a specification.

This invention relates to the margin-gage, line-locking and other carriage stop mechanisms of typewriting machines, etc.

In this class of mechanism, it is usual to provide a rack, and a margin-gage, line-locking or other member adjustable along the rack, determining the stopping place of the carriage or the place at which the bell shall be rung or the keys locked.

The principal object of my invention is to provide a simple, inexpensive, and easily applied device for releasably locking such adjustable member to the rack.

In carrying out my invention, I employ a T-lever comprising a bar and a stem, the bar having midway between its ends a dog to engage the rack, and the stem comprising a handle, whereby the lever may be rocked or tipped in either direction; that is to say, the ends of the bar or cross-portion of the T constitute fulcrums upon either of which the lever may be rocked to withdraw the dog from the rack. Continued pressure upon the handle in either direction after releasing the dog causes the adjustable member to slide along the rack. Springs are provided for returning the T-lever.

In the accompanying drawings, Fig. 1 is a rear elevation of a Sun No. 6 typewriting machine, showing my improved margin-gage devices. Fig. 2 shows the handle of the T-lever tipped to the left to release the dog and slide the margin-gage or stop toward the left. Fig. 3 shows the normal positions of the parts. Fig. 4 shows the handle tipped to release the dog and slide the margin-gage toward the right. Fig. 5 is an end elevation of the rack and margin-gage. Fig. 6 is a fragmentary plan of the same.

The usual platen 1 of the Sun typewriting machine is mounted upon a carriage which comprises ends 2 and a grooved bar 3 extending along the lower rear part of the carriage. Upon the latter is mounted a rack 4 having along one edge a groove 5 to receive tongues 6 formed upon margin-gages or stop members 7, 8; each of the latter also having grooved blocks 9 to fit upon a rib 10 formed on the rear of the rack. The members 7 and 8 are thus mounted to slide freely along the rack.

Each of the adjustable members 7, 8 is provided with a dog 11 to fit between the rack teeth and lock the member against displacement. Said dog 11 is carried upon a bar 12 which preferably lies upon the top face of the member 7 or 8, that is, the side thereof that covers the rack teeth, the member 7 or 8 having an opening 13 down through which the dog projects. The dog is withdrawn by means of a handle 14 which together with the bar 12 forms a T-lever, the handle being the stem portion of the T. At its ends, the bar 12 is perforated at 15 to fit upon the bases of a pair of studs 16, 17, whereby longitudinal displacement of the bar upon the adjustable member 7 or 8 is avoided. When it is desired to slide the adjustable member to the left, the operator merely presses a finger-piece 14 in that direction, so that it moves from the normal Fig. 3 position to the Fig. 2 position. The stud which engages the left hand end of the bar 12, and toward which the bar is pressed by the handle, serves as a fulcrum or bearing upon which said bar is rocked up sufficiently at its other end to withdraw the dog 11; and continued pressure in the same direction upon the handle causes the member 7 or 8 to move in the same direction. Pressure in the contrary direction will move the T-lever from the Fig. 3 against the other stud to the Fig. 4 position, likewise releasing the dog; and continued pressure in the same direction will slide the member 7 or 8 to the right.

The dog lever is returned to normal position by means of compression springs 18 coiled around the studs 16, and confined between the ends of the bar 12 and caps in the form of nuts 19 threaded upon the tops of the studs. The latter at their bases are sufficiently large to fit fairly closely in the perforations 15 in the bar 12; but above their bases they are tapered sufficiently to permit either end of the bar to swing up while the other end remains depressed and in contact with the top surface of the adjustable member 8. The springs normally press the bar 12 down upon that side of the slide which covers the teeth of the rack.

The member 7 has a stop 20 to engage a stop 21 provided upon the machine frame to limit the travel of the carriage in letter feeding direction; and the member 8 has a similar stop 22 to engage the stop 23 to limit the return movement of the carriage to begin a new line. The member 7 has a depending tongue 24 to operate a bell striker 25; and it also has a depending tongue 26 to operate a key locking member 27.

Variations may be resorted to within the scope of the invention.

Having thus described my invention, I claim:

1. The combination with a rack, of a member to be adjusted along the rack, studs mounted upon said member, a bar loosely mounted upon said studs to move endwise thereof and having a rack-engaging dog between said studs, a handle connected to the bar to rock either end thereof away from the rack to disengage the dog, and yielding means to restore the bar and dog, said yielding means including compression springs coiled around the studs and bearing upon the ends of the bar.

2. The combination with a rack, of a member to be adjusted along the rack, tapering studs upon said member and having caps, a bar loosely mounted upon said studs to move endwise thereof and having a rack-engaging dog between said studs, a handle projecting from the bar to rock either end thereof away from the rack to disengage the dog, and springs compressed between the caps and the ends of the bar.

3. The combination with a rack, of a member adjustable along the rack, a T-lever movable in either direction from normal position, and comprising a bar and a handle projection therefrom, said bar connected to the adjustable member to move therewith along said rack and having a dog normally engaging the rack, supports for the ends of the bar, constituting fulcrums toward either of which the handle may press the bar to lift its other end away from the rack, to withdraw the dog from the rack, and a spring at each end of the bar to press the same toward the rack.

4. The combination with a rack, of a member adjustable along the rack, a T-lever movable in either direction from normal position, and comprising a bar and a handle projecting therefrom, said bar connected to the adjustable member to move therewith along said rack and having a dog normally engaging the rack, supports for the ends of the bar, constituting fulcrums toward either of which the handle may press the bar to lift its other end away from the rack, to withdraw the dog from the rack, said adjustable member comprising a plate-portion which covers the teeth of the rack, and a spring normally pressing said bar upon said plate portion.

5. The combination with a rack, of a member adjustable along the rack, a T-lever movable in either direction from normal position, and comprising a bar and a handle projecting therefrom, said bar connected to the adjustable member to move therewith along said rack and having a dog normally engaging the rack, supports for the ends of the bar, constituting fulcrums toward either of which the handle may press the bar to lift its other end away from the rack, to withdraw the dog from the rack, said adjustable member comprising a plate-portion which covers the teeth of the rack, and a spring normally pressing said bar upon said plate portion, said dog extending through a perforation in said plate portion to engage the teeth of the rack.

6. The combination with a rack, of a member adjustable along the rack, a T-lever movable in either direction from normal position, and comprising a bar and a handle projecting therefrom, said bar connected to the adjustable member to move therewith along said rack and having a dog normally engaging the rack, supports for the ends of the bar, constituting fulcrums toward either of which the handle may press the bar to lift its other end away from the rack, to withdraw the dog from the rack, said adjustable member comprising a plate-portion which covers the teeth of the rack, and a spring normally pressing said bar upon said plate portion, said dog extending through a perforation in said plate portion to engage the teeth of the rack, said plate portion having guides projecting therefrom to guide the ends of the bar away from the rack.

7. The combination with a rack, of a member adjustable along the rack and having one side covering the rack teeth, a bar spring-pressed upon said side, a tooth extending through said side to engage the rack teeth, a handle projecting from the upper side of said bar, and fulcrums upon said side for the ends of said bar, toward either of which fulcrums the handle may press the bar to lift the other end of the bar and release the dog from the rack.

8. The combination with a rack, of a member adjustable along the rack and having one side covering the rack teeth, a bar spring-pressed upon said side, a tooth extending through said side to engage the rack teeth, a handle projecting from the upper side of said bar, and fulcrums upon said side for the ends of said bar, toward either of which fulcrums the handle may press the bar to lift the other end of the bar and release the dog from the rack, said guides in the form of studs projecting from one of said bar and side elements into engagement with the other of said elements.

LEE S. BURRIDGE.

Witnesses:
JOHN O. SEIFERT,
CLARA RIPLEY.